United States Patent [19]
Uchiyama

[11] 4,361,366
[45] Nov. 30, 1982

[54] TRACK GUIDE LINEAR MOTION BEARING DEVICE

[75] Inventor: Masayuki Uchiyama, Maebashi, Japan

[73] Assignee: Nippon Seiko Kabushiki Kaisha, Tokyo, Japan

[21] Appl. No.: 239,901

[22] Filed: Mar. 3, 1981

[30] Foreign Application Priority Data

Mar. 5, 1980 [JP] Japan .................. 55-26592

[51] Int. Cl.³ .................. F16C 29/04; F16D 3/06
[52] U.S. Cl. .................. 308/6 C; 308/3 A; 464/167
[58] Field of Search .................. 308/3 A, 6 R, 6 C; 464/167, 168

[56] References Cited

U.S. PATENT DOCUMENTS

| | | | |
|---|---|---|---|
| 2,452,117 | 10/1948 | Ferger | 308/6 C |
| 3,552,806 | 1/1971 | Weasler et al. | 308/6 C |
| 3,800,558 | 4/1974 | Buthe et al. | 464/167 X |
| 3,808,839 | 5/1974 | Teramachi | 64/23.7 |
| 3,897,982 | 8/1975 | Teramachi | 308/6 R |
| 3,938,854 | 2/1976 | Teramachi | 308/6 R |
| 3,975,064 | 8/1976 | Nilsson | 308/6 C |
| 4,040,679 | 8/1977 | Teramachi | 308/6 C |
| 4,165,195 | 8/1979 | Teramachi | 308/6 C |

FOREIGN PATENT DOCUMENTS 1302026 1/1973 United Kingdom .............. 308/6 C

Primary Examiner—Robert S. Ward, Jr.
Attorney, Agent, or Firm—Wyatt, Gerber, Shoup, Scobey & Badie

[57] ABSTRACT

A track guide linear motion bearing device comprises an outer sleeve, a square elongated guide bar, a retainer, a number of balls, and end caps. The outer sleeve has three no-load ball guide grooves formed in the axial inner surface thereof having a substantially C-shaped cross-section and two ball rolling grooves formed between the no-load ball guide grooves. The grooves extend over the entire axial length of the outer sleeve. The guide bar is provided, in both upper corner portions thereof, with axially extending ball guide grooves corresponding to the ball rolling grooves of the outer sleeve. The retainer is loosely fitted between the guide bar and the outer sleeve and is formed in the outer surface thereof with a plurality of outwardly opening endless track grooves each comprising a load side groove, a no-load side groove and a U-turn groove. The balls are disposed for rolling in the endless track grooves of the retainer and held between the ball rolling grooves of the outer sleeve and the ball guide grooves of the guide bar in the through-hole portions of the load side grooves of the retainer. The end caps are secured to the ends of the outer sleeve to restrain the axial movement of the retainer. Each of the end caps has guide surfaces corresponding in number to the endless track grooves which guide the balls rolling in the U-turn grooves of the retainer.

4 Claims, 5 Drawing Figures

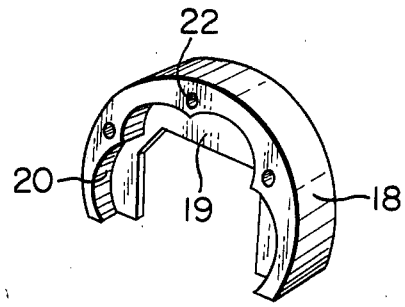
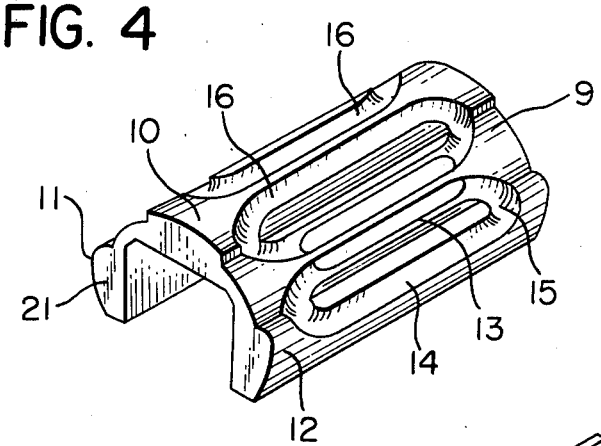
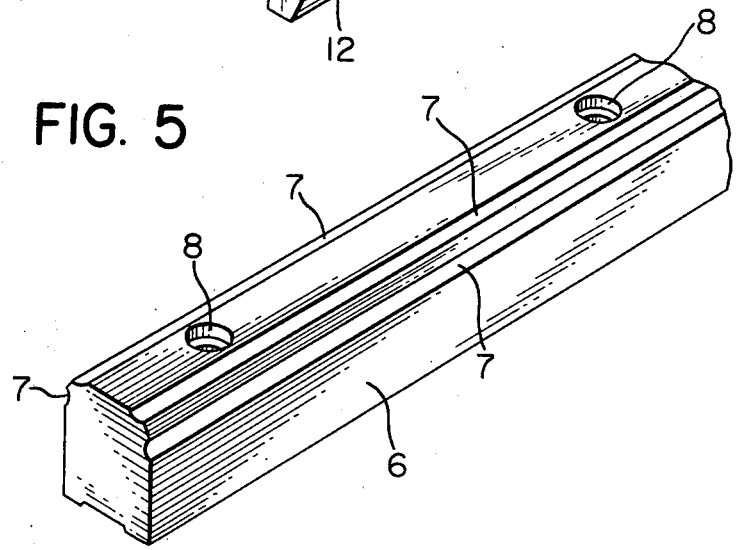

TRACK GUIDE LINEAR MOTION BEARING DEVICE

BACKGROUND OF THE INVENTION

1. Field of the Invention

This invention relates to a track guide linear motion bearing device for use as a guide element in a machine tool, apparatus or the like, and more particularly to a track guide linear motion bearing device of such a construction wherein a retainer is provided for preventing the balls of the bearing device from slipping out of position when an outer sleeve and guide bar are separated from each other.

2. Description of the Prior Art

A track guide linear motion bearing device is normally provided with an outer sleeve comprising a pillar-like member provided with an axial inner surface having a substantially C-shaped cross-section, said inner surface being alternately formed with ball rolling grooves and no-load ball guide grooves circumferentially thereof. A guide bar is also provided and typically includes in its outer surface, ball guide grooves corresponding to the ball rolling grooves of the outer sleeve. The bearing balls may roll along the endless track grooves of a retainer and are fitted between the ball rolling grooves of the outer sleeve and the ball guide grooves of the guide bar. The outer sleeve is thus rectilinearly movable relative to the guide bar and has a great capability of bearing the load because the balls are supported in concave grooves. Further advantages are that circumferential back-lash can be eliminated because the angles of contact between the balls can be made alternately different in direction, and the device is convenient to handle because the retainer prevents the balls from slipping out when the outer sleeve and the guide bar are separated from each other. However, a prior art track guide linear motion bearing device (U.S. Pat. No. 3,897,982) is such that the ball rolling grooves and the no-load ball guide grooves somewhat deeper than the ball rolling grooves are alternately formed circumferentially of the inner wall of a cylinder, and circumferential grooves having the same depth as the no-load ball guide grooves are formed in the opposite end portions thereof and, therefore, an inclined surface connecting the bottoms of the circumferential groove and the ball rolling groove is formed in the connecting portion of these grooves. Thus, the balls which have rolled down into the ball rolling grooves must suddenly change their direction of movement at this inclined surface portion, and this has led to a disadvantage that it is difficult for the balls to move smoothly.

Also, the prior art track guide linear motion bearing device is often assembled by arranging balls in the endless track groove of a retainer, and then inserting this retainer into an outer sleeve and, therefore, balls cannot be placed into the portion in which the endless track groove of the retainer overlaps the branch-off zone between the ball rolling groove and the no-load ball guide groove of the outer sleeve when the retainer is inserted and, thus, the number of balls that can be used has unavoidably been small. This in turn has led to a disadvantage that on the no-load ball guide groove side, the movement of balls is liable to become intermittent and the collision of balls becomes great to render the operation unstable.

If it is desired to incorporate a required number of balls into this prior art track guide bearing device, it is necessary to elastically deform and widen the through-hole of the endless track groove provided in the retainer and incorporate the balls from the inner surface side. This has meant a disadvantage that a very unproductive manual work is unavoidably involved to incorporate all the balls in the device.

Further, the prior art track guide linear motion bearing device is of such a construction that the retainer is guided by the balls or by the guide bar and, therefore, the balls receive resistance from the retainer, so that the rolling of the balls is not smooth, thus making it difficult to provide smooth operation.

In another prior art track guide linear motion bearing device (U.S. Pat. No. 3,938,854), the guide bar is an elongated bar-like member provided with a pair of ball guide grooves in both shoulders thereof, and provided with concave cut-away portions in the side surface portions thereof. This guide bar also has a cross-section in which the lower part of the concave cut-away portions is laterally bulged, and the ball guide groove portion of this guide bar is usually subjected to a hardening treatment to harden the surface thereof. Flame hardening or high frequency hardening is generally adopted as this hardening treatment.

Flame hardening is a advantageous in that it can be carried out relatively simply, but it is liable to produce irregularity of hardness and cause bending deformation due to the residual stress of the heat treatment. The presence of bending deformation in such an elongated guide bar would cause the finishing allowance during griding to vary greatly and would undesirably reqire a number of grinding steps to be involved.

High frequency hardening generally involves less bending deformation for bar-like elongated members and it is desirable as a heat treatment for such an elongated guide bar.

However, even by the use of high frequency hardening, it is very difficult to harden such an elongated member without bending it and, in the case of the treatment thereof, the hardening treatment is effected with the guide bar being vertically supported and while rotating the guide bar inserted in a circular high frequency coil. Even in a case where such a hardening treatment is effected, the hardness penetration is non-uniform in the upper and lower surfaces of the guide bar because the cross-sectional shape of the conventional guide bar is not symmetrical in vertical direction and, as a result, the bending deformation by the hardening has not been unavoidable, which has led to a disadvantage that a number of subsequent grinding steps are required.

Further, in the conventional guide bar, the side surfaces thereof perpendicular to the bottom surface thereof are small and, therefore, it is difficult to obtain an accurate reference surface when ball guide grooves are formed by grinding and this has led to the difficulty with which the guide bar is properly mounted on a jig when the ball guide grooves are to be formed by grinding, which in turn has made it difficult to obtain a guide bar of good accuracy.

SUMMARY OF THE INVENTION

The present invention has been made in view of the above-noted disadvantages peculiar to the prior art and has for its object to provide a track guide linear motion bearing device in which smooth operation of balls is obtained and which is easy to machine and assemble as well as high in accuracy.

To achieve such object, according to the present invention, ball rolling grooves and no-load ball guide grooves of an outer sleeve are provided circumferentially over the length thereof, and the cross-section of the outer sleeve is made into the same cross-sectional shape. Projected portions engaging the no-load ball guide grooves of the outer sleeve are provided in the outer surface of a retainer so that the retainer is circumferentially positioned and held relative to the outer sleeve, and end caps are provided on the ends of the outer sleeve so that with the end caps removed, a required number of balls can easily be incorporated between the endless track grooves of the retainer and the outer sleeve. The cross-section of a guide bar is made into a square shape substantially symmetrical both in vertical and horizontal directions to reduce heat treatment deformation, and a large side surface of the guide bar provides the reference surface for machining, thereby facilitating the machining of the ball guide grooves.

The invention will become more fully apparent from the following detailed description of an embodiment thereof taken in conjunction with the accompanying drawings.

BRIEF DESCRIPTION OF THE DRAWINGS

FIGS. 3, 4 and 5 are perspective views of various parts.

DESCRIPTION OF THE PREFERRED EMBODIMENT

Figure 1:
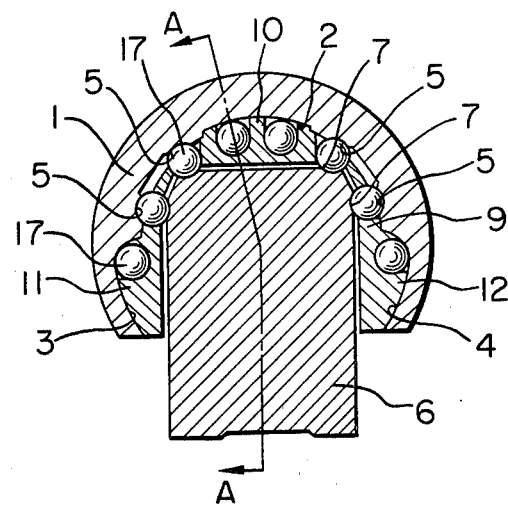
FIG. 1 is a cross-sectional view showing an embodiment of the present invention.
Figure 2:
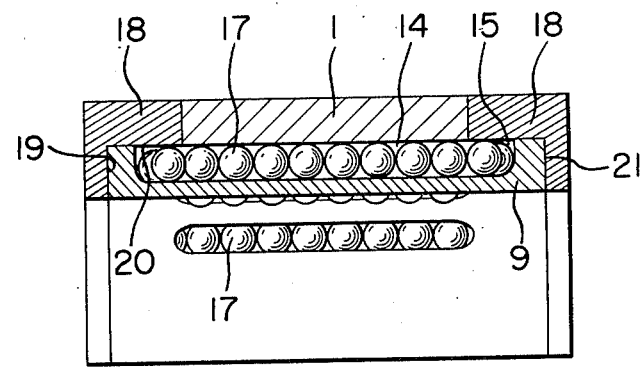
FIG. 2 is a sectional view taken along line A—A of FIG. 1 with a guide bar 6 omitted.

An outer sleeve 1 has three no-load ball guide grooves 2, 3, 4 formed in the axial inner surface thereof having a substantially C-shaped cross-section, and has two ball rolling grooves 5, 5 formed between the no-load ball guide grooves 2 and 3, and 2 and 4, respectively, said grooves extending over the entire axial length of the outer sleeve.

A guide bar 6 is an elongated member having a substantially square cross-section substantially symmetrical both in vertical and horizontal directions, the elongated member being provided, in both upper corner portions thereof, with axially extending ball guide grooves 7 corresponding to the ball rolling grooves 5 of the outer sleeve. Reference numeral 8 designates mounting bolt holes.

A retainer 9 has, on its outer surface, a projected portion 10 engaging the no-load ball guide groove 2 of the outer sleeve, a projected portion 11 engaging the no-load ball guide groove 3 of the outer sleeve, and a projected portion 12 engaging the no-load ball guide groove 4 of the outer sleeve. The inner surface of the retainer is made into a square cross-sectional portion slightly larger than the cross-section of the guide bar 6, and the outer surface of the retainer is formed into a C-shape conforming to the inner surface of the outer sleeve 1. This retainer 9 is circumferentially positioned with respect to the outer sleeve 1 by the projected portions 10, 11, 12 being engaged with the no-load ball guide grooves 2, 3, 4, respectively, of the outer sleeve and is held by the outer sleeve 1.

Formed in the outer surface of the retainer 9 are four endless track grooves 16 each comprising a load side groove 13 having an inwardly extending portion in the portion corresponding to the ball rolling groove 5 of the outer sleeve, a no-load side groove 14 formed in the portions correspnding to the no-load ball guide grooves 2, 3, 4 of the outer sleeve, and a U-turn groove 15 smoothly connecting the ends of the no-load side groove 14 and the load side groove 13 to each other so that the variation in curvature is substantially continuous.

This retainer 9 can be manufactured by machining a drawn material, but where a number of such retainers are to be manufactured, the use of molding of plastics or the like is desirable.

A required number of balls 17 are disposed in the endless track grooves 16 of the retainer 9 loosely fitted to the oute sleeve 1 and are rolling-recirculatable along the endless track grooves 16, and the balls 17 are partly projected toward the inner surface side in the through-hole portions of the load side grooves 13 of the retainer and held between the ball rolling grooves 5 of the outer sleeve and the ball guide grooves 7 of the guide bar.

The through-hole of the load side groove 13 of the retainer 9 is made slightly smaller in width dimension than the diameter of the ball 17, so that even when the guide bar 6 is separated, the balls 17 would never drop out of the retainer 9.

Respective end caps 18 are secured to opposite end surfaces of the outer sleeve 1. Each end cap has a substantially C-shaped cross-section corresponding to the outer sleeve 1 and the retainer 9 combined together, and one end surface of the end cap is provided with a recess having a flat bottom 19, and the side surfaces of this recess provide four guide surfaces 20 corresponding to the endless track grooves 16 which guide the balls 17 rollingly displaced in the U-turn grooves 15 of the retainer, outside of the end portion of the outer sleeve 1. The guide surfaces 20 may preferbly be arcs having different center positions.

The retainer 9 is prevented from axially moving relative to the outer sleeve 1 by the end surface 21 of the retainer being engaged with the bottom 19 of the end cap. Designated by 22 are bolt holes for securing the end cap 18 to the outer sleeve 1.

By the above-describedc construction, there is provided a track guide linear motion bearing device in which the outer sleeve 1 is unable to rotate circumferentially of the guide bar 6 and is very lightly movable axially thereof by rolling of the balls 17.

The assembly of this track guide linear motion bearing device may be accomplished by securing an end cap 18 to one end of the outer sleeve 1 by means of bolts, inserting the retainer 9 into the outer sleeve 1 with the outer sleeve 1 brought into an upright position in which the end cap 18 is lower, making ball-inserting means such as a chute or the like face the upper end of the outer sleeve 1, thereby loading the balls 17 into the endless track grooves 16 of the retainer. The balls 17 are arranged in the portion of the U-turn groove which extends outwardly of the end of the outer sleeve 1, with a slight amount of oil such as grease being provided to this groove portion so that the balls 17 do not slip out, and anothe end cap 18 is secured to the other end of the outer sleeve by means of bolts, whereby the assembly to the outer sleeve 1 is completed.

This assembled outer sleeve 1 is fitted to the guide bar 6, whereby a track guide linear motion bearing device is completed.

In the track guide linear motion bearing device of the present invention constructed as described above, the cross-section of the outer sleeve 1 provided with the no-load ball guide grooves 2, 3, 4 and ball rolling grooves 5 in the inner surface thereof is uniform in shape over the entire axial length thereof and this facilitates the machining, and the projected portions 10, 11 and 12 engaging the no-load ball guide grooves 2, 3, and 4 of the outer sleeve are provided in the outer surface of the retainer 9 fitted to the outer sleeve 1 to accomplish the circumferential positioning of the retainer 9 relative to the outer sleeve 1 and, therefore, when the retainer 9 is inserted into the outer sleeve 1, the ball rolling grooves 5 of the outer sleeve and the load side grooves 13 of the retainer assume a proper positional relation, thus enabling the balls 17 to be incorporated easily.

According to such construction, when the position of the outer sleeve 1 is determined, the inserted position of the balls 17 is determined, thus enabling the balls 17 to be automatically assembled with ease.

Also, the balls 17 rolling in the ball rolling grooves 5 of the outer sleeve 1 are recirculated while being guided by the endless track grooves 16 of the retainer 9, but in the conventional track guide linear motion bearing device, the portion in which the balls move from the ball rolling grooves 5 of the outer sleeve to the no-load ball guide groove 2, 3 or 4 is designed such that an inclined escape portion is provided at the end of the ball rolling grooves and directed into a circumferential groove of the same depth as the no-load ball guide grooves so that the balls are moved into the no-load ball guide grooves by the U-turn grooves of the retainer and therefore, movement of the balls has not been smooth. In the present invention, however, the U-turn grooves 15 of the retainer are so shaped that the balls 17 rolling along the ball rolling grooves 5 and the no-load ball guide groove 2, 3 or 4 effect smooth curved movement and this leads to the provision of a track guide linear motion bearing device in which recirculation of the balls 17 is very smooth and which is excellent in operating characteristic. Also, the retainer 9 of the present invention is designed to be held by the outer sleeve 1 and the retainer 9 is not supported by the guide bar 6 or the balls 17 and thus, it has a good operating characteristic.

Further, in the track guide linear motion bearing device of the present invention, the end caps 18 are removably secured to the opposite end surfaces of the outer sleeve 1, thus enabling a required number of balls 17 to be easily assembled, and there is produced little or no noise which would otherwise result from deficiency of the number of balls, and smooth operation is ensured.

Still further, the cross-sectional shape of the guide bar 6 is a square substantially symmetrical both in vertical and horizontal directions and therefore, during high frequency hardening, respective corner portions of the guide bar are uniformly surface-hardened and the thermal deformation due to hardening can be reduced, which in turn leads to the possibility of reducing the finishing allowance of the subsequent grinding step, which also means a reduced number of machining steps. The possibility of reducing the finishing allowance means a small part removed by the grinding step, which in turn means small re-bending deformation arising from the imbalance of residual stress which results from said removal, and this leads to the ease with which a guide bar 6 of high accuracy is obtained, unlike the case where the bending deformation due to quenching is re-bent, and it is also desirable in the viewpoint of age deformation.

Furthermore, the square-shaped cross-section of the guide bar 6 enables a wide reference surface of good accuracy to be obtained on a side surface thereof, and leads to the ease with which the mounting accuracy during the grinding of the ball guide grooves 7 is provided, and also enables stable holding to be accomplished even for the grinding resistance during machining, thus ensuring a guide bar 6 of high accuracy to be obtained.

The square cross-section of the guide bar 6 provides another effect. That is, in the conventional guide bar having a complicated cross-sectional shape, the drawing work is generally considered to be best suited, but a material having a good hardening property which is presently used for such a guide bar requires the steps of hardening the material by the drawing work, and then annealing the material and in addition, the drawing work causes torsion of the material to be produced. However, the square material according to the present invention is a commercially readily available material whch has been subjected to drawing and annealing and such material has little or no torsion attributable to the drawing and thus, it enables a guide bar 6 of high accuracy to be manufactured at low cost.

Although, in the track guide linear motion bearing device of the present invention, the projected potion 10, 11 or 12 of the retainer is engaged with the no-load ball guide grooves 2, 3, 4 of the outer sleeve, use may be made of other means for causing the retainer 9 to be positioned and held on the outer sleeve 1, to obtain the same operational effect.

I claim:

1. A track guide linear motion bearing device comprising:

an outer sleeve having three no-load ball guide grooves formed in the axial inner surface thereof having a substantially C-shaped cross-section and two ball rolling grooves formed between said no-load ball guide grooves, said grooves extending over the entire axial length of said outer sleeve;

a square elongated guide bar provided, in both upper corner portions thereof, with axially extending ball guide grooves corresponding to the ball rolling grooves of said outer sleeve;

a retainer loosely fitted between said guide bar and said outer sleeve, said retainer being formed in the outer surface thereof with a plurality of outwardly opening endless track grooves each comprising a load side groove having an inwardly extending portion in the portion corresponding to the ball rolling groove of the outer sleeve, a no-load side groove formed in the portions corresponding to the no-load ball guide grooves of said outer sleeve, and a U-turn groove smoothly connecting the ends of said load side groove and said no-load side groove to each other;

a number of balls disposed for rolling in the endless track grooves of said retainer and held between the ball rolling grooves of said outer sleeve and the ball guide grooves of said guide bar in the through-hole portions of the load side grooves of said retainer; and end caps secured to the ends of said outer sleeve to restrain the axial movement of said retainer, each of said end caps having guide surfaces corresponding in number to the endless track grooves which guide said balls rolling in the U-turn grooves of said retainer.

2. A track guide linear motion bearing device according to claim 1, wherein said retainer has in the outer surface thereof projected portions engaging the no-load ball guide grooves of said outer sleeve so that the retainer may be held by the outer sleeve.

3. A track guide linear motion bearing device according to claim 1 or 2, wherein each of said guide surfaces comprises an arc.

4. A track guide linear motion bearing device according to claim 1, wherein said U-turn groove connects the ends of said load side groove tangentially continuously.

* * * * *